(12) United States Patent
Nakao et al.

(10) Patent No.: US 6,319,013 B2
(45) Date of Patent: *Nov. 20, 2001

(54) WIRING STRUCTURE FOR MOTORCYCLE WITH BUSBARS

(75) Inventors: Kazuhiko Nakao; Yukihiro Hayasaka; Hiroshi Sakamoto, all of Tsurugashima (JP)

(73) Assignee: Toyo Denso Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,494

(22) Filed: Dec. 1, 1998

(30) Foreign Application Priority Data

| Dec. 1, 1997 | (JP) | ................................................. 9-329849 |
| Dec. 1, 1997 | (JP) | ................................................. 9-329850 |
| Dec. 1, 1997 | (JP) | ................................................. 9-329851 |

(51) Int. Cl.$^7$ .................................................. H01R 33/00
(52) U.S. Cl. ........................... 439/34; 439/248; 439/736; 361/813
(58) Field of Search ........................ 439/34, 76.1, 949, 439/248, 736; 307/9.1; 296/78.1; 361/638, 813

(56) References Cited

U.S. PATENT DOCUMENTS

| 3,954,318 | * | 5/1976 | Larson et al. ........................ 439/248 |
| 4,473,251 | * | 9/1984 | Murayama ........................... 296/78.1 |
| 4,485,282 | * | 11/1984 | Lee ..................................... 200/51 R |
| 4,785,532 | * | 11/1988 | Galloway et al. .............. 264/272.11 |
| 4,954,085 | * | 9/1990 | Inoue et al. .............................. 439/34 |
| 5,238,429 | * | 8/1995 | Margrave et al. .................... 439/736 |
| 5,737,188 | * | 4/1998 | Flierl et al. ........................... 361/715 |
| 5,745,347 | * | 4/1998 | Miller .................................. 361/813 |
| 5,777,851 | * | 7/1998 | Yamamoto ........................... 361/813 |
| 5,952,729 | * | 9/1999 | Shiratori et al. ...................... 307/9.1 |
| 6,129,560 | * | 10/2000 | Baur et al. ........................... 439/736 |

FOREIGN PATENT DOCUMENTS

| 60-244680 | 12/1985 | (JP) . |
| 08251889 | 9/1996 | (JP) . |
| 271018 | 2/1996 | (TW) . |

* cited by examiner

Primary Examiner—Neil Abrams
(74) Attorney, Agent, or Firm—Arent Fox Kintner Plotkin & Kahn

(57) ABSTRACT

A housing 41 of a meter unit 5 is inserted from above into a meter unit support hole 43 which is provided in a rear handle cover 1. Engagement claws $41_1 \ldots _3$ of the housing 41 are engaged with claw receiving portions $1_9$ of the rear handle cover 1, thereby preventing the housing 41 from coming out. A male connector 25 is provided beforehand in the rear handle cover 1, and inserting the housing 41 of the meter unit 5 into the meter unit support hole 43 causes a female connector 44 of the housing 41 to be automatically connected to the male connector 25, thus completing the wiring work of the meter unit 5. The wiring work on the meter unit 5 supported on the rear handle cover 1 of a motorcycle V can therefore be performed easily and reliably. The handle cover encloses a substrate 21 in which busbars 22 are embedded.

7 Claims, 18 Drawing Sheets

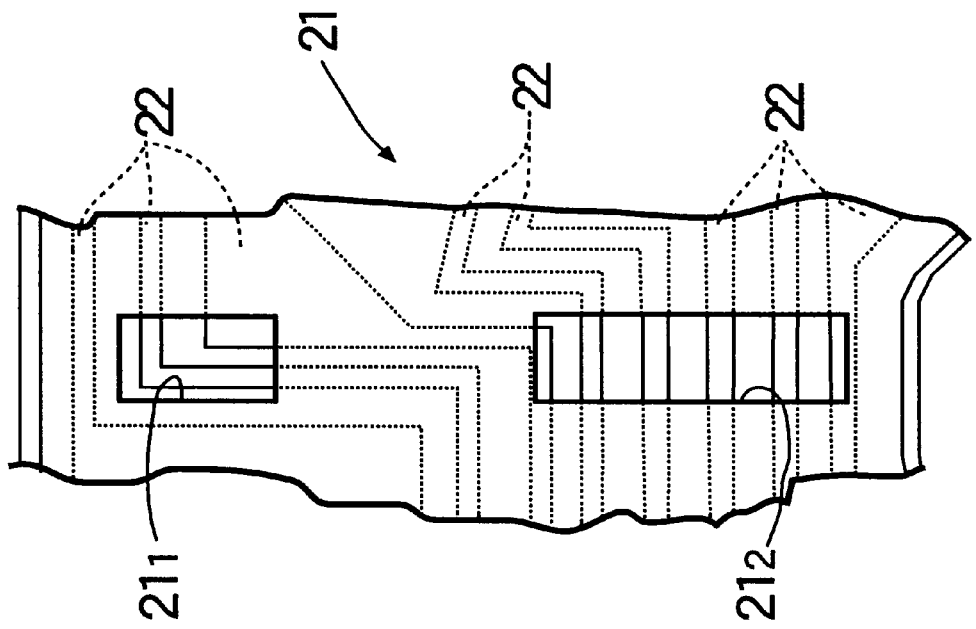
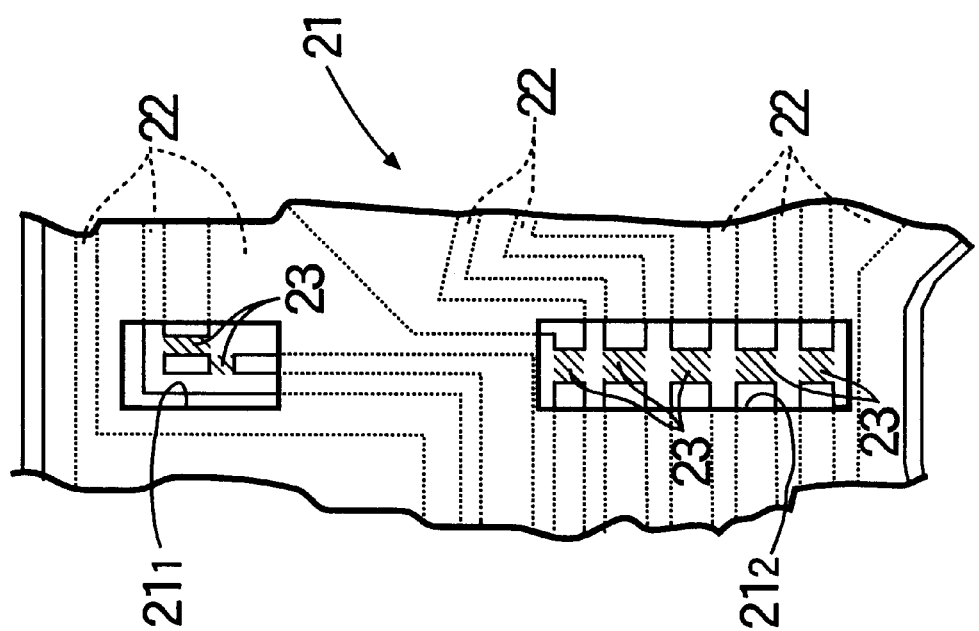

WIRING STRUCTURE FOR MOTORCYCLE WITH BUSBARS

BACKGROUND OF THE INVENTION

1. Field of the Invention

The present invention relates to a wiring structure and a wiring method for a motorcycle to electrically connect an electric part supported on a handle cover of the motorcycle, such as meters and switches, with a conductor installed in the handle cover.

2. Description of the Related Art

Wiring for electric parts such as meters and switches provided on a handle cover covering the bar handle of a motorcycle has been accomplished via wiring harness (see Japanese Patent Application Laid-Open No. 60-244680, for example).

In the above conventional wiring, because connectors provided at the ends of a wiring harness need to be connected to electric parts such as meters and switches on the inner side of the handle cover after the electric parts are attached to the handle cover, there has been a problem that the connection and disconnection work of the connectors is troublesome and assembly manhours increase. In addition, since the front and rear handle covers cannot be joined until after the wiring work is completed, a possibility of deteriorated work efficiency has been raised. Another drawback is that the wiring harness easily tangles and coils during wiring, degrading the assembly work efficiency and giving rise to a possibility that short-circuits, wire breaks and erroneous connections may occur.

SUMMARY OF THE INVENTION

The present invention has been accomplished under these circumstances and it is a first object of this invention to facilitate and make reliable the wiring work on the meters supported on the handle cover.

It is a second object of this invention to facilitate and make reliable the assembly work of switches into the handle cover and the wiring of the switches.

It is a third object of this invention to facilitate and make reliable the wiring work of electric parts supported on the handle cover without using a wiring harness.

To achieve the first objective, a first feature of this invention provides a wiring structure for a motorcycle to electrically connect a meter supported on a handle cover of the motorcycle to conductors arranged inside the handle cover, wherein a handle cover side connector connected to the conductors is provided inside a meter support hole formed in the handle cover and the meter is inserted into the meter support hole thereby to connect a meter side connector provided in the meter to the handle cover side connector.

With the above construction, simply inserting the meter into the meter support hole formed in the handle cover results in the connection between the meter side connector of the meter and the handle cover side connector inside the meter support hole, so that the wiring between the conductors arranged inside the handle cover and the meter can be completed easily and reliably.

To achieve the second objective, a second feature of this invention provides a wiring structure for a motorcycle to electrically connect a switch supported on a handle cover of the motorcycle to conductors arranged inside the handle cover, wherein the conductor is comprised of busbars made of a metal plate or a metal bar embedded in a busbar embedding substrate of a synthetic resin, tip ends of the busbars are projected from the busbar embedding substrate toward an opening formed in the handle cover to form busbar side connector terminals, and switch side connector terminals provided inside the switch are inserted into the opening to connect the busbar side connector terminals and the switch side connector terminals.

With this construction, simply inserting the switch side connector terminals provided to the switch from the opening of the handle cover causes the switch side connector terminals to be connected to the busbar side connector terminals projecting from the busbar embedding substrate, automatically completing the wiring for the switch. Further, because the above-mentioned wiring work can be performed from outside the handle cover, the handle cover can be assembled beforehand, thus enhancing the work efficiency. Because the conductors connected to the switch are formed of a metal plate or a metal bar embedded in a synthetic resin, not only can the number of parts and manhours required for wiring be reduced but the possibility of short-circuit, wire break and erroneous assembly can also be reduced, compared with a case where the conventional wiring harness is used. Durability for long-term use is also improved over what is obtained by the wiring harness. Further, since the front ends of the busbars are projected from the busbar embedding substrate to form busbar side connector terminals, it is possible to reduce the parts count of the connectors and also the frequency of incidents of poor contacts and wire breaks, thus enhancing the reliability. Furthermore, because the switch side connector terminals are provided inside the switches, their deformations and damages can be prevented, thereby improving the electric contact reliability.

To achieve the third objective, a third feature of this invention provides a wiring method for a motorcycle to supply electricity to an electric part supported on a handle cover of the motorcycle, which wiring method comprises: a step of injection-molding a busbar embedding substrate of a synthetic resin having a plurality of busbars made of a metal plate or a metal bar embedded therein; a step of injection-molding a handle cover made of a synthetic resin to enclose at least a part of the busbar embedding substrate; and a step of mounting the electric part on the handle cover and electrically connecting the electric part to the busbars.

With the above method, the use of the busbar embedding substrate having the busbars embedded therein can reduce the number of parts and manhours required for wiring, compared with a case where the wiring harness is used. In addition, this wiring method can reduce the possibility of short-circuits, wire breaks and erroneous assembly and therefore can offer a better long-term durability than the method that the wiring harness is used.

These and other objects, features and advantages of this invention will become apparent from the following detailed description of preferred embodiments of this invention with reference to the accompanying drawings.

BRIEF DESCRIPTION OF THE DRAWINGS

FIGS. 1 through 13 show a first embodiment of this invention.

FIG. 1 is a rear view of a motorcycle;

FIG. 2 is an enlarged view of an essential part of FIG. 1 showing a front side of a rear handle cover;

FIG. 3 shows a rear side of the rear handle cover;

FIG. 4 is a cross section view taken along a line 4—4 of FIG. 3;

FIG. 5 is a cross section view taken along a line 5—5 of FIG. 3;

FIG. 6 is an enlarged view of an essential part of FIG. 5;

FIG. 7 shows a busbar embedding substrate;

FIGS. 8A and 8B are enlarged views of essential part of FIG. 7;

FIG. 9 is a perspective view of a female connector on the meter side;

FIG. 10 is an enlarged cross section taken along a line 10—10 of FIG. 2;

FIG. 11 is a perspective view of a male terminal and a female terminal of a connector of a switch; and FIG. 12 is a perspective view of a starter switch;

FIG. 13 is a wiring diagram with busbars.

FIG. 14 is a cross section view similar to FIG. 5, but according to the second embodiment of the present invention and FIG. 15 shows a cross section view taken along a line 15—15 of FIG. 14.

FIG. 17 is an enlarged cross section view similar to FIG. 10 but according to the fourth embodiment of the present invention and FIG. 18 is a perspective view of male and female terminals of a connector of the switch.

DETAILED DESCRIPTION OF THE PREFERRED EMBODIMENTS

The first embodiment of this invention will be described by referring to FIGS. 1 to 13.

Figure 1:
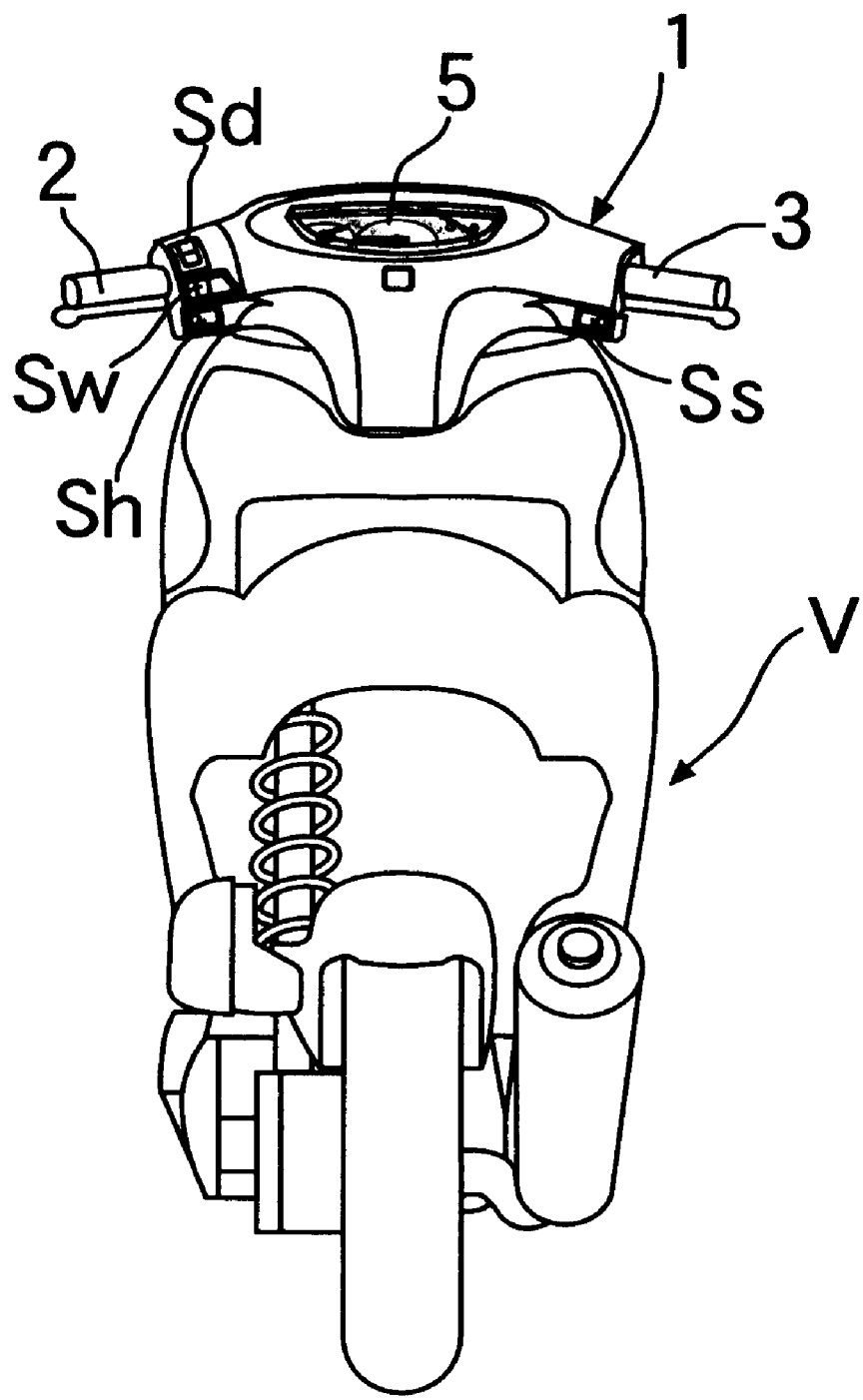

FIG. 1 is a rear view of a scooter type motorcycle V, which has the rear part of a bar handle covered with a rear handle cover 1 of synthetic resin, from both end of which project a left grip 2 and a right grip 3.

Figure 2:
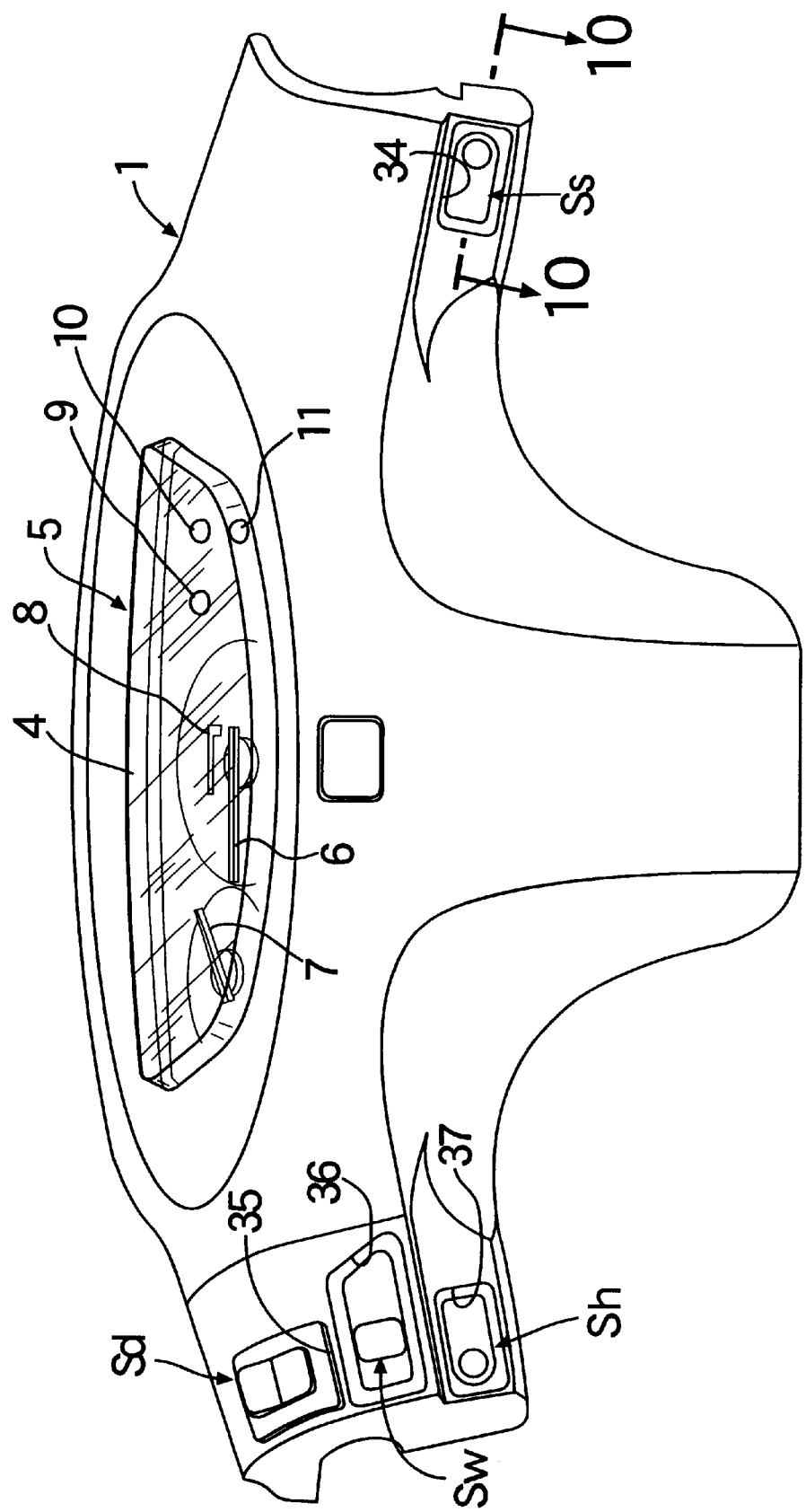

FIG. 2 is an enlarged view of the outer side of the rear handle cover 1 (the side that can be seen from a rider), at the center of which is provided a meter unit 5 covered with a transparent meter cover 4. The meter unit 5 includes a speed meter 6, a fuel meter 7, an odometer 8, a speed warning lamp 9, a turn pilot lamp 10, and an oil warning lamp 11. The rear handle cover 1 has a starter switch Ss at the right end thereof and a dimmer switch Sd, a winker switch Sw and a horn switch Sh at the left end thereof. The meter unit 5, starter switch Ss, dimmer switch Sd, winker switch Sw and horn switch Sh all constitute the electric parts of this invention.

Figure 3:
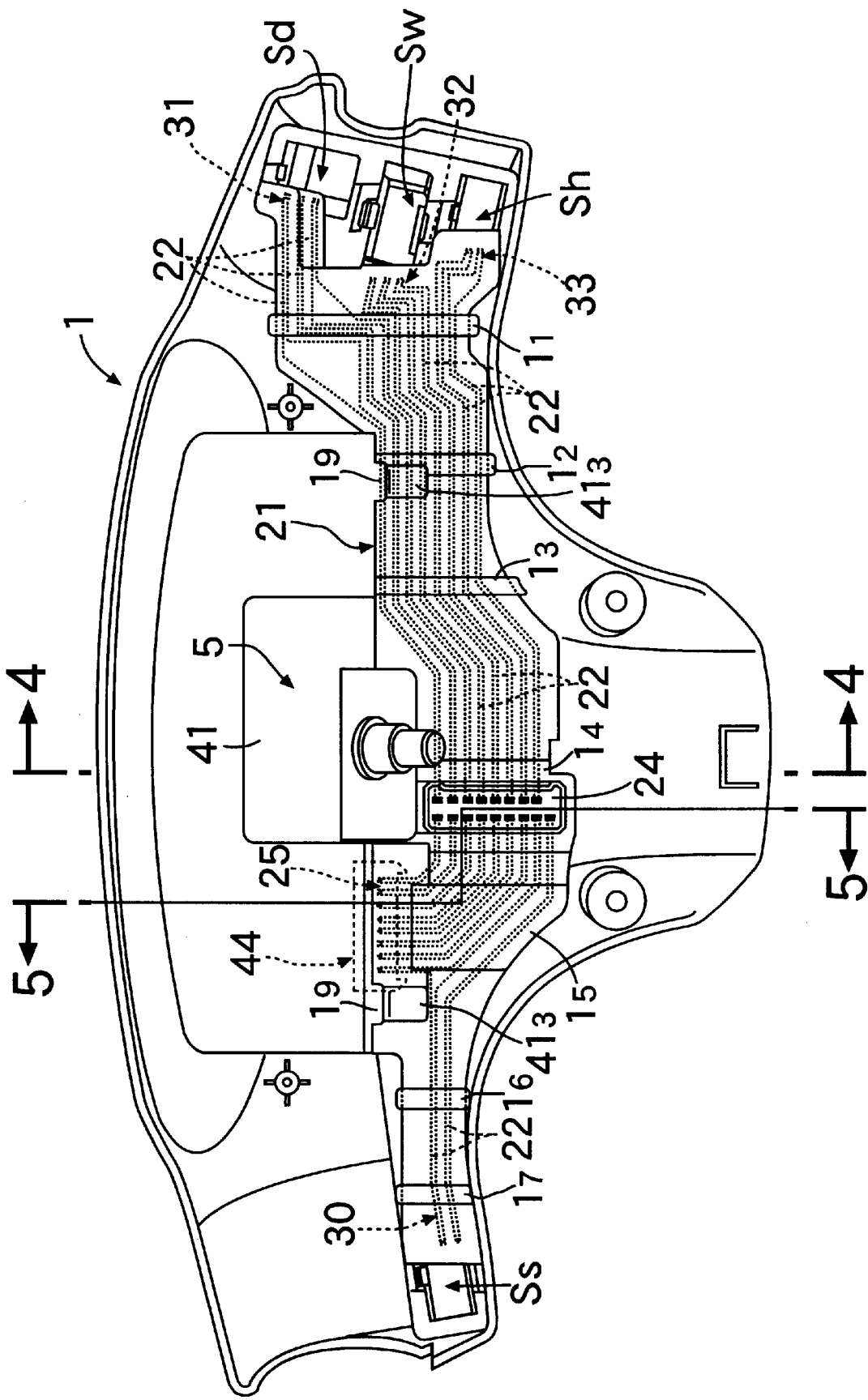

FIG. 3 shows the rear handle cover 1 of FIG. 2 as seen from the back of the drawing. The inner side of the rear handle cover 1 is normally covered with a front cover which is not shown so that it cannot be seen from outside. On the inner side of the rear handle cover 1 are laterally arranged a busbar embedding substrate 21 in place of the conventional wiring harness. The meter unit 5, starter switch Ss, dimmer switch Sd, winker switch Sw and horn switch Sh are connected to a battery and electric parts provided on the vehicle body side of the motorcycle V through busbars 22 . . . embedded in the busbar embedding substrate 21.

Figure 7:
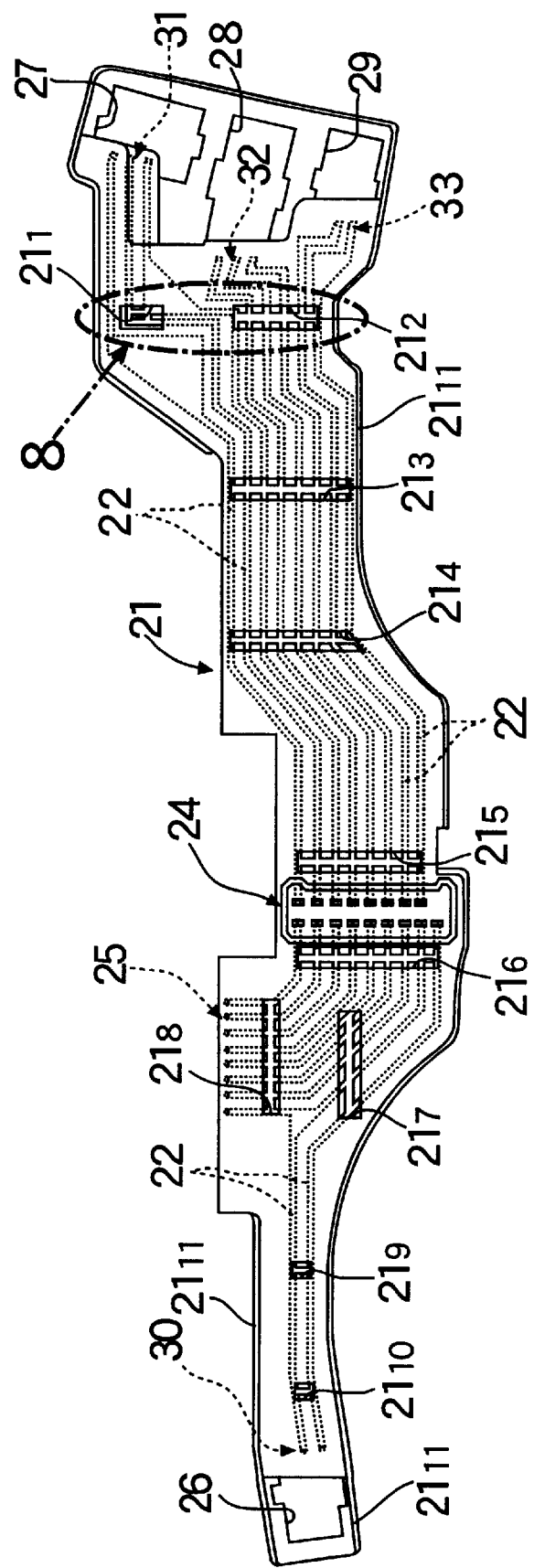

FIG. 7 shows a busbar embedding substrate 21 alone, made by the injection molding of a synthetic resin, in which a number of conductive busbars 22 . . . , punched from a metal plate, are embedded. The busbar embedding substrate 21 has ten openings $21_1$–$21_{10}$, from which a part of the busbars 22 . . . is exposed. Because each of the busbars 22 . . . is formed of a fine and thin metal strip, it is difficult to embed these busbars 22 with positioning in an orderly manner in the busbar embedding substrate 21 when injection-molding the busbar embedding substrate 21. Hence, a plurality of busbars 22 . . . are integrally connected by connecting portions 23 . . . at areas corresponding to the openings $21_1$, $21_2$ of the busbar embedding substrate 21(see shaded portions in FIG. 8A).

Interconnecting the plurality of busbars 22 . . . by the connecting portions 23 . . . can prevent the busbars 22 . . . as an assembly set from coming apart, thus facilitating its manufacture and handling. Further, when setting the busbars 22 . . . as an assembly set in the molding die for the injection molding of the busbar embedding substrate 21, the portions of the busbars 22 . . . that are integrally connected together through the connecting portions 23 . . . are held to face the openings $21_1$, $21_2$ in the busbar embedding substrate 21 so that the positioning of the busbars 22 . . . can be facilitated and made reliable.

After the busbar embedding substrate 21 is injection-molded, the connecting portions 23 . . . of the busbars 22 . . . facing the openings $21_1$, $21_2$ are cut and removed to electrically isolate the individual busbars 22 . . . from each other, as shown in FIG. 8B. Because the connecting portions 23 . . . of the busbars 22 . . . can be cut and removed by using the openings $21_1$, $21_2$, special openings need not be formed. While in the above description two $21_1$, $21_2$ of the ten openings $21_1$–$21_{10}$ in the busbar embedding substrate 21 are taken as an example, the same applies to the remaining eight openings $21_3$–$21_{10}$.

As can be seen from FIG. 7, the busbar embedding substrate 21 has integrally formed therewith at the central part a male connector 24 which is connected to a battery and electric parts provided on the vehicle body side of the motorcycle V, and a male connector 25 connected to the meter unit 5. The busbar embedding substrate 21 has formed at one end thereof an opening 26 in which the starter switch Ss is installed, and also has formed at the other end thereof three openings 27, 28, 29 in which the dimmer switch Sd, winker switch Sw and horn switch Sh are installed. These openings 26–29 are integrally provided with male connectors 30–33 respectively. The rear handle cover 1 is provided with four openings 34–37 that correspond to the openings 26–29 formed in the busbar embedding substrate 21 (see FIG. 2).

Figure 13:
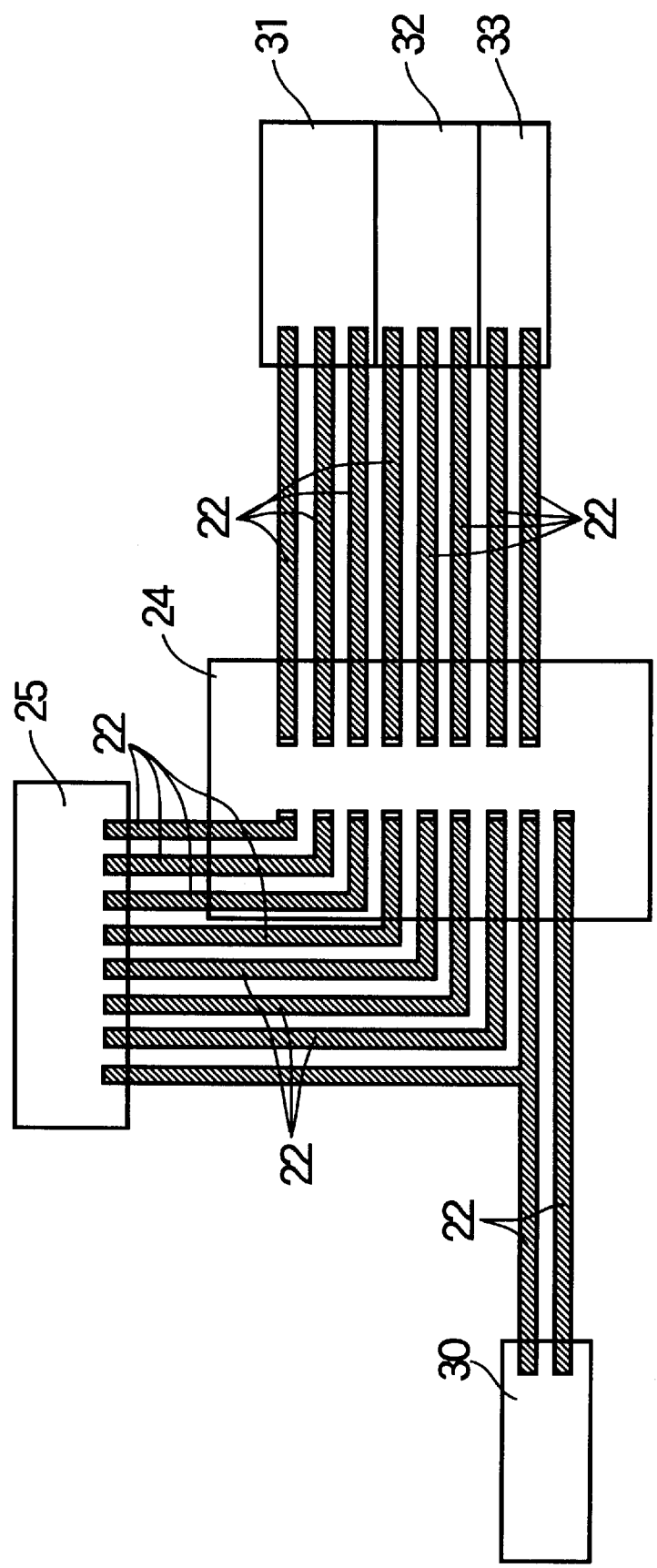

As shown in FIG. 13, the male connector 24 to be connected to the battery and electric parts, the male connector 25 to be connected to the meter unit 5, and the male connectors 30–33 to be connected to the four switches Ss, Sd, Sw, Sh are interconnected by the plurality of busbars 22 . . .

When injection-molding the rear handle cover 1 with a synthetic resin, the busbar embedding substrate 21 is set in a molding die so that it is formed integral with the rear handle cover 1. That is, a collar $21_{11}$, protruding from the outer peripheral part of the busbar embedding substrate 21 (see FIG. 7) is embedded in a lap portion $1_{10}$ of the rear handle cover 1 so that the busbar embedding substrate 21 can be supported on the rear handle cover 1 (see FIG. 5). FIG. 3 shows the busbar embedding substrate 21 formed integral with the rear handle cover 1. As shown in the figure, the busbar embedding substrate 21 is supported on the rear handle cover 1 by seven bridge portions $1_1$–$1_7$ that are part of the rear handle cover 1. As apparent from FIG. 3 and FIG. 7 combined, the bridge portion $1_1$ is formed to cover two openings $21_1$, $21_2$ in the busbar embedding substrate $21_3$; the bridge portion $1_2$ is formed to cover an opening $21_3$; the bridge portion $1_3$ is formed to cover an opening $21_4$; the bridge portion $1_4$ is formed to cover two openings $21_5$, $21_6$; the bridge portion $1_5$ is formed to cover two openings $21_7$, $21_8$; the bridge portion $1_6$ is formed to cover an opening $21_9$; and the bridge portion $1_7$ is formed to cover an opening $21_{10}$.

Figure 4:
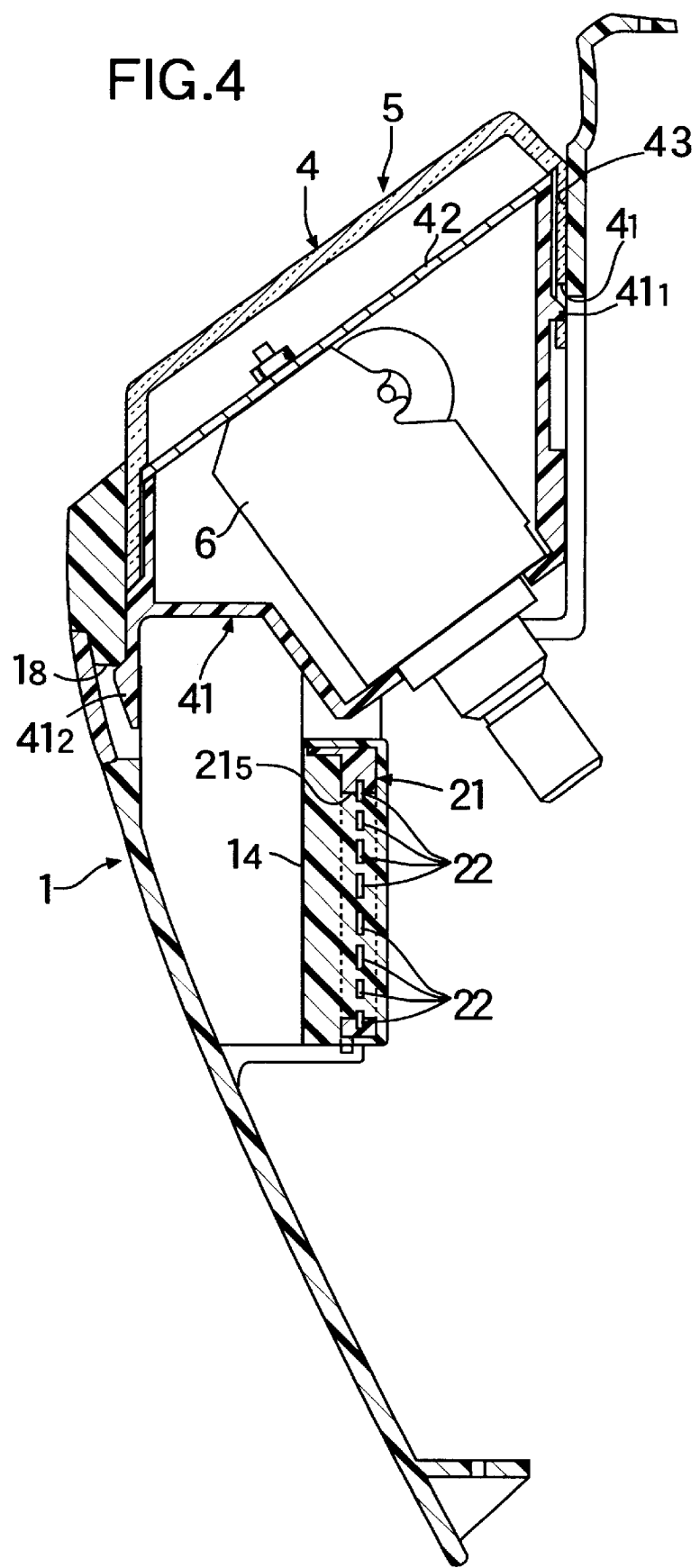

FIG. 4 shows the bridge portion $1_4$, one of the seven bridge portions $1_1$–$1_7$, in a cross section. In the bridge portion $1_4$ is situated the opening $21_5$ of the busbar embedding substrate 21, which is embedded by the synthetic resin that forms the rear handle cover 1. Hence, the eight busbars 22 . . . exposed in the opening $21_5$ are completely covered with the synthetic resin and thus insulated from one another.

Because in this construction the busbar embedding substrate 21 embedding the plurality of busbars 22 . . . is molded of synthetic resin and, during the process of molding the rear handle cover 1, is formed integral with the rear handle cover 1 by seven bridge portions $1_1$–$1_7$, there are the following advantages.

First, by forming separate from the rear handle cover 1 the busbar embedding substrate 21 which is relatively complex in structure because of the embedded busbars 22 . . . , the molding die for the busbar embedding substrate 21 and the molding die for the rear handle cover 1 can be simplified in construction.

Second, because the busbar embedding substrate 21 is formed separately from the rear handle cover 1, the thickness of the rear handle cover 1 can be made uniform without being affected by the thickness of the busbar embedding substrate 21, molding sinks can be prevented, thereby enhancing the appearance of the rear handle cover 1.

Third, because the busbar embedding substrate 21 is formed integral with the rear handle cover 1 by embedding the busbar embedding substrate 21 in the plurality of bridge portions $1_1$–$1_7$, the busbar embedding substrate 21 and the rear handle cover 1 reinforce with each other to increase the overall rigidity.

Fourth, because a synthetic resin is automatically filled into the openings $21_1$–$21_{10}$ of the busbar embedding substrate 21 when embedding the busbar embedding substrate 21 in the bridge portions $1_1$–$1_7$, no special filling process is required, thereby reducing manhours.

Next, the process of mounting the meter unit 5 onto the rear handle cover 1 will be explained by referring to FIGS. 3 to 5.

The meter unit 5 has a container-shaped housing 41 that supports the speed meter 6, fuel meter 7, odometer 8, speed warning lamp 9, turn pilot lamp 10 and oil warning lamp 11. A meter panel 42 is held between the opening of the housing 41 and the meter cover 4. A plurality of engagement claws $41_1$, . . . are formed on the outer periphery of the housing 41, and engaging the engagement claws $41_1$ . . . into claw receiving portions $4_1$ . . . formed in the meter cover 4 causes the housing 41 and the meter cover 4 to be joined together (see FIG. 4).

The meter unit 5 is inserted from above into a meter unit support hole 43 recessed at the central part of the rear handle cover 1. At this time, as shown in FIG. 4, an engagement claw $41_2$ formed on the rear side (rider side) of the housing 41 engages a claw receiving portion $1_8$ which is formed so that it may face the meter unit support hole 43. Also as shown in FIGS. 3 and 5, two lateral engagement claws $41_3$, $41_3$ formed on the front side of the housing 41 engage two claw receiving portions $1_9$, $1_9$, with the result that the meter unit 5 is fixed to the rear handle cover 1.

Figure 5:
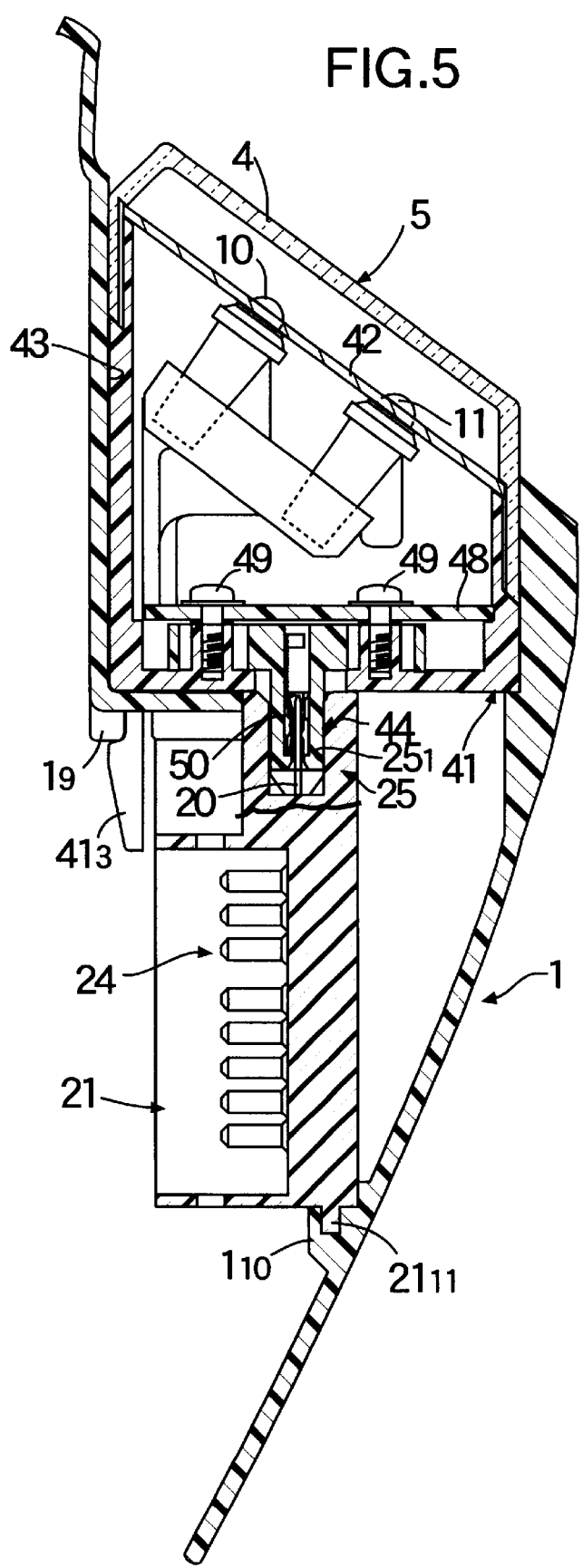

As shown in FIGS. 3 and 5, when the meter unit 5 is inserted into the meter unit support hole 43, a female connector 44 provided in the meter unit 5 is automatically coupled to the male connector 25 formed integral with the busbar embedding substrate 21. The male connector 25 on the busbar embedding substrate 21 side has a groove-shaped recess $25_1$ opening upwardly and a plurality of male terminals 20 . . . integrally extending from the busbars 22 . . . and projecting into the recess $25_1$. The male connector 25 constitutes a handle cover side connector of this invention and the female connector 44 constitutes a meter unit side connector of this invention.

Figure 9:
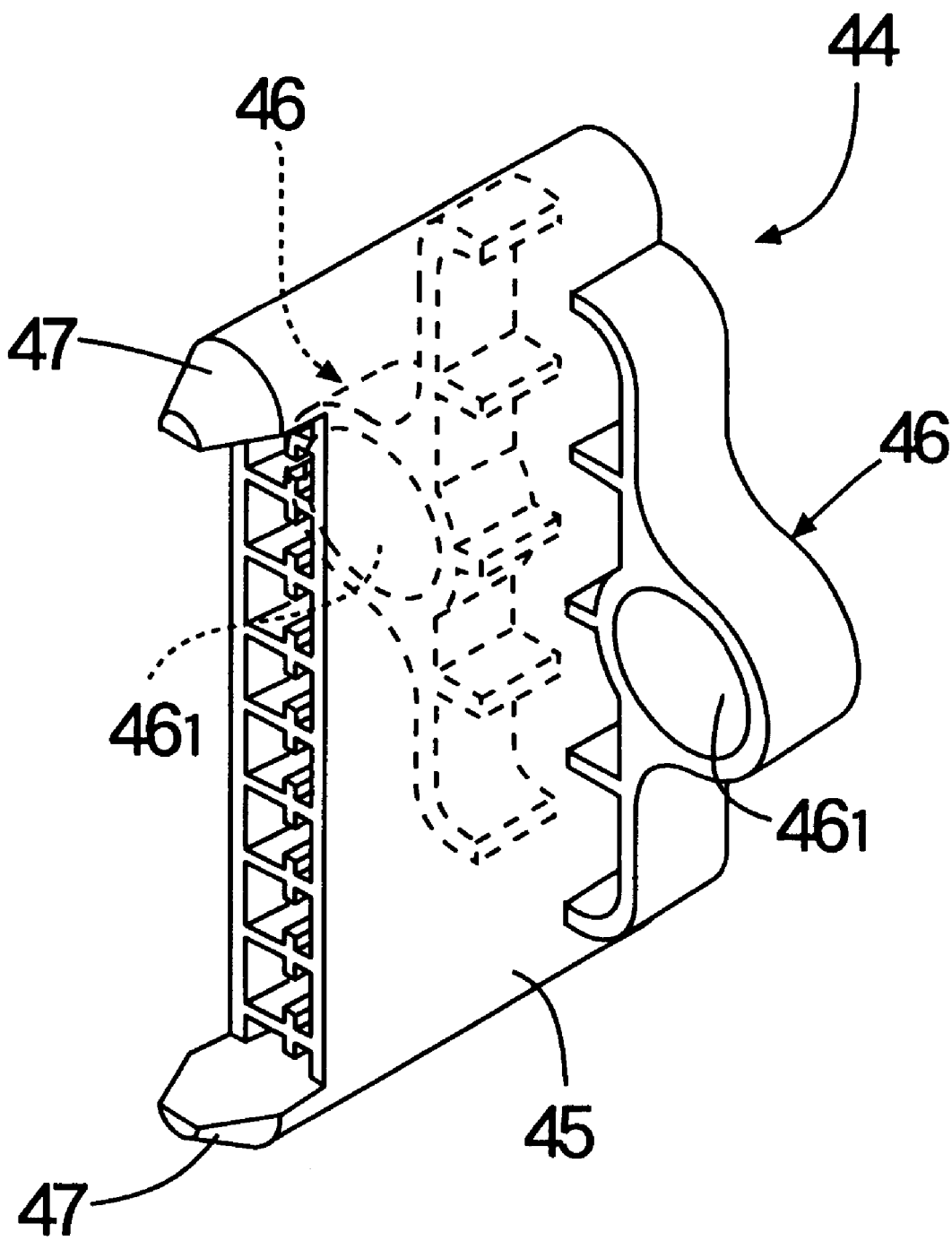

FIG. 9 shows the female connector 44 on the meter unit 5 side, which has a pair of guide portions 46, 46 projecting to the left and right from the upper end of a plate-shaped body portion 45 and having circular guide holes $46_1$, $46_1$ formed therein. At its lower end, the body portion 45 is formed with two downward tapering half-split conical guide projections 47, 47, which can engage an outwardly expanding guide surface $25_2$ formed at the inlet of the recess $25_1$, (see FIG. 6). These guide projections 47, 47 and the guide surface $25_2$ constitute a centering means of this invention.

Figure 6:
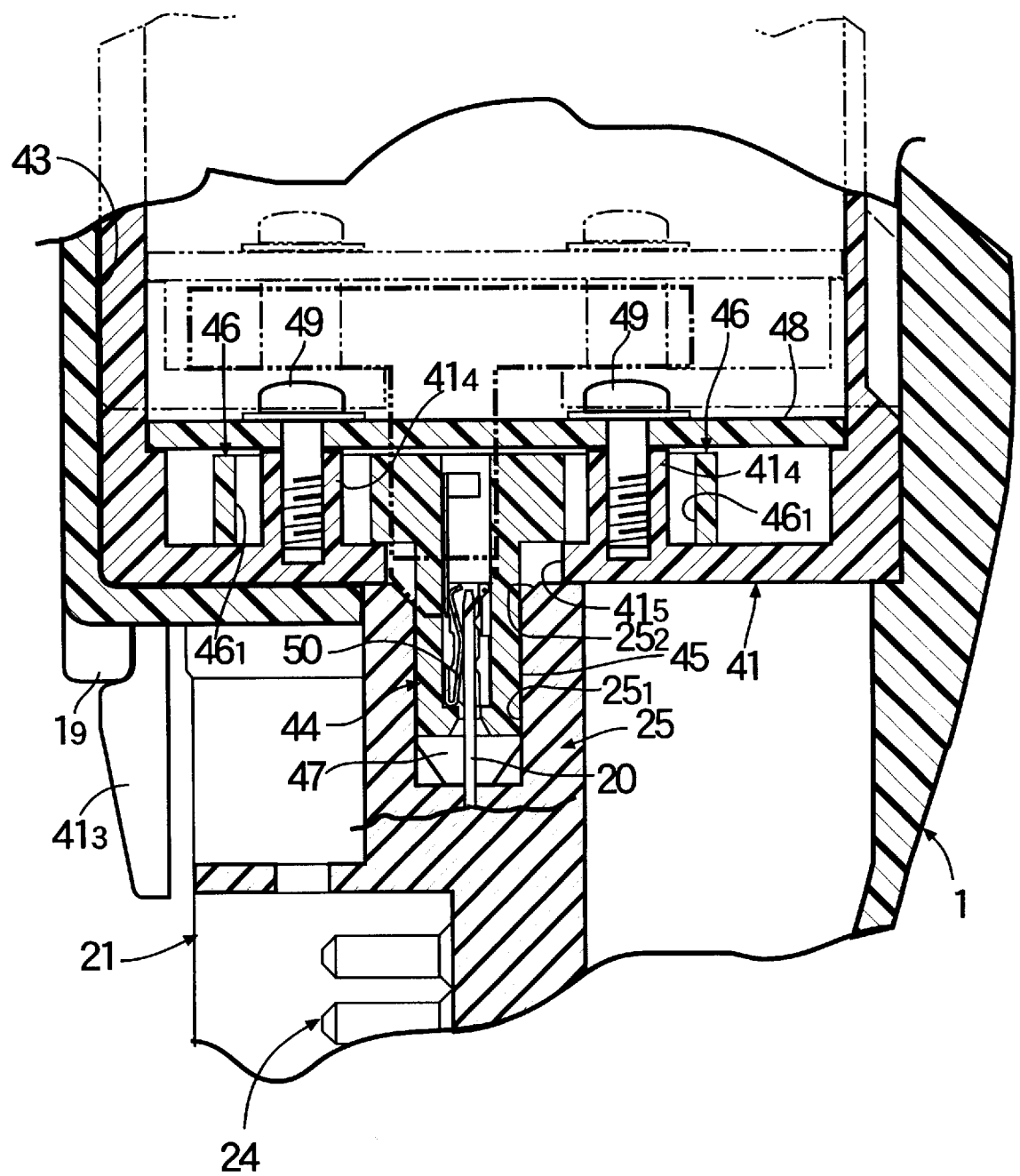

As can be seen from FIGS. 5, 6 and 9, a retaining plate 48 is supported on the upper surface of a pair of bosses $41_4$, $41_4$ projecting upwardly from the bottom wall of the housing 41 and is securely held by the bolts 49, 49. The female connector 44 has its guide holes $46_1$, $46_1$ loosely fitted over the outer circumferences of the bosses $41_4$, $41_4$ and is sandwiched from above and below between the bottom wall of the housing 41 and the retaining plate 48 so that it will not be come out. The diameter of the guide holes $46_1$, $46_1$ is set slightly larger than that of the bosses $41_4$, $41_4$ so that the female connector 44 can be moved relative to the housing 41 over a distance corresponding to the difference between these diameters. The body portion 45 of the female connector 44 is loosely fitted in the opening $41_5$ formed in the bottom wall of the housing 41 to allow relative movement of the body portion 45 with respect to the housing 41.

When the meter unit 5 is inserted from above into the meter unit support hole 43 of the rear handle cover 1, even if the body portion 45 of the female connector 44 on the meter unit 5 side is deviated from the recess $25_1$ of the male connector 25 on the busbar embedding substrate 21 (see a chain line in FIG. 6), the tapered guide projections 47, 47 of the female connector 44 are guided along the guide surface $25_2$ of the male connector 25, therefore the floatingly supported female connector 44 is automatically centered and joined to the male connector 25. This in turn causes the male terminals 20 . . . of the male connector 25 to be inserted and connected to female terminals 50 . . . of the female connector 44.

Figure 10:
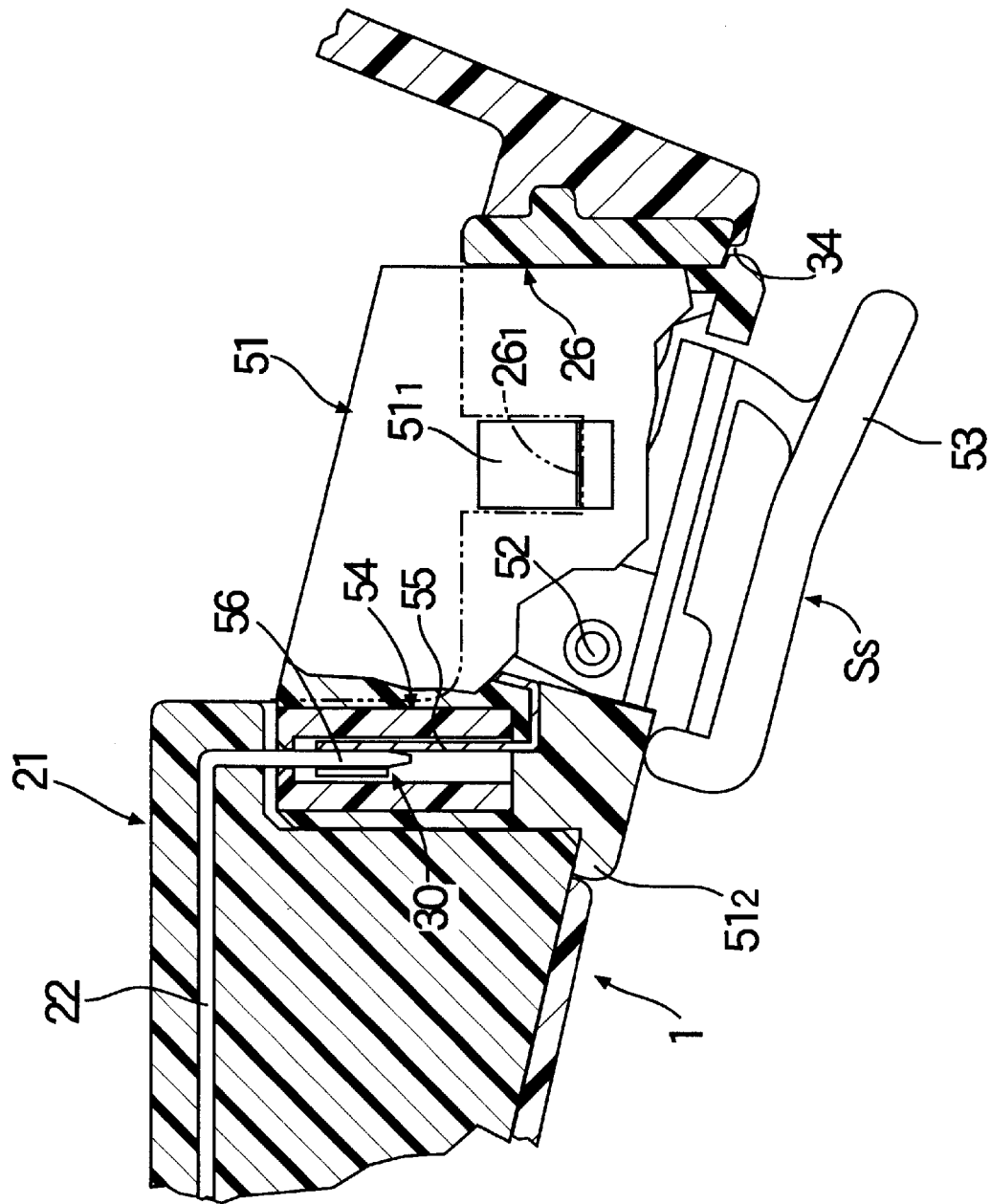
Figure 11:
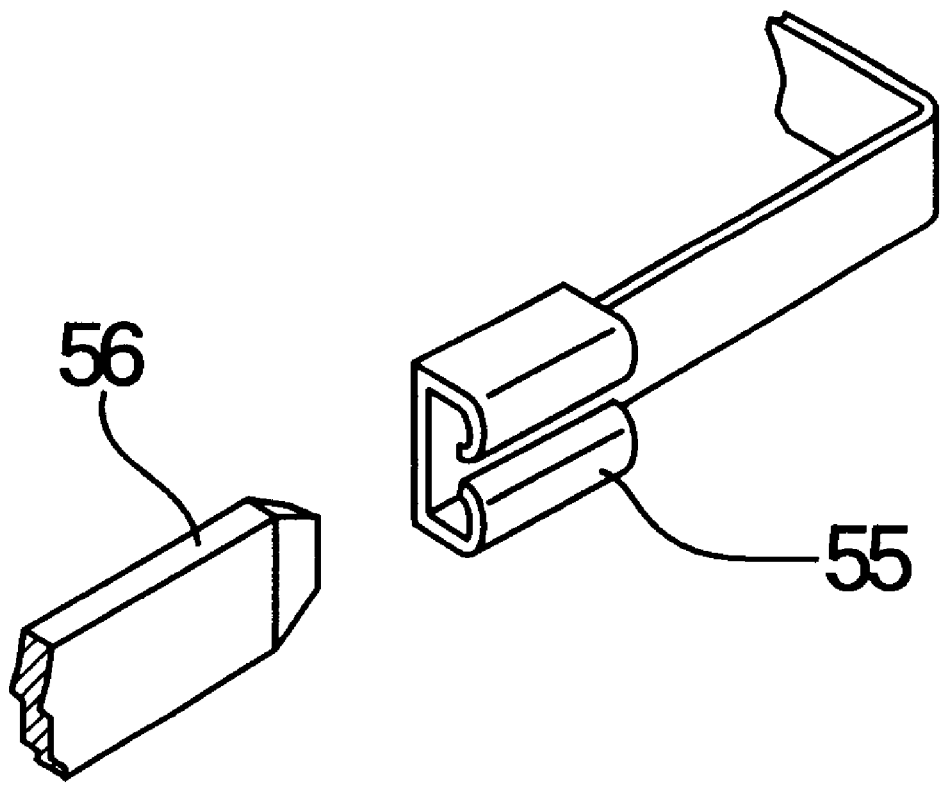
Figure 12:
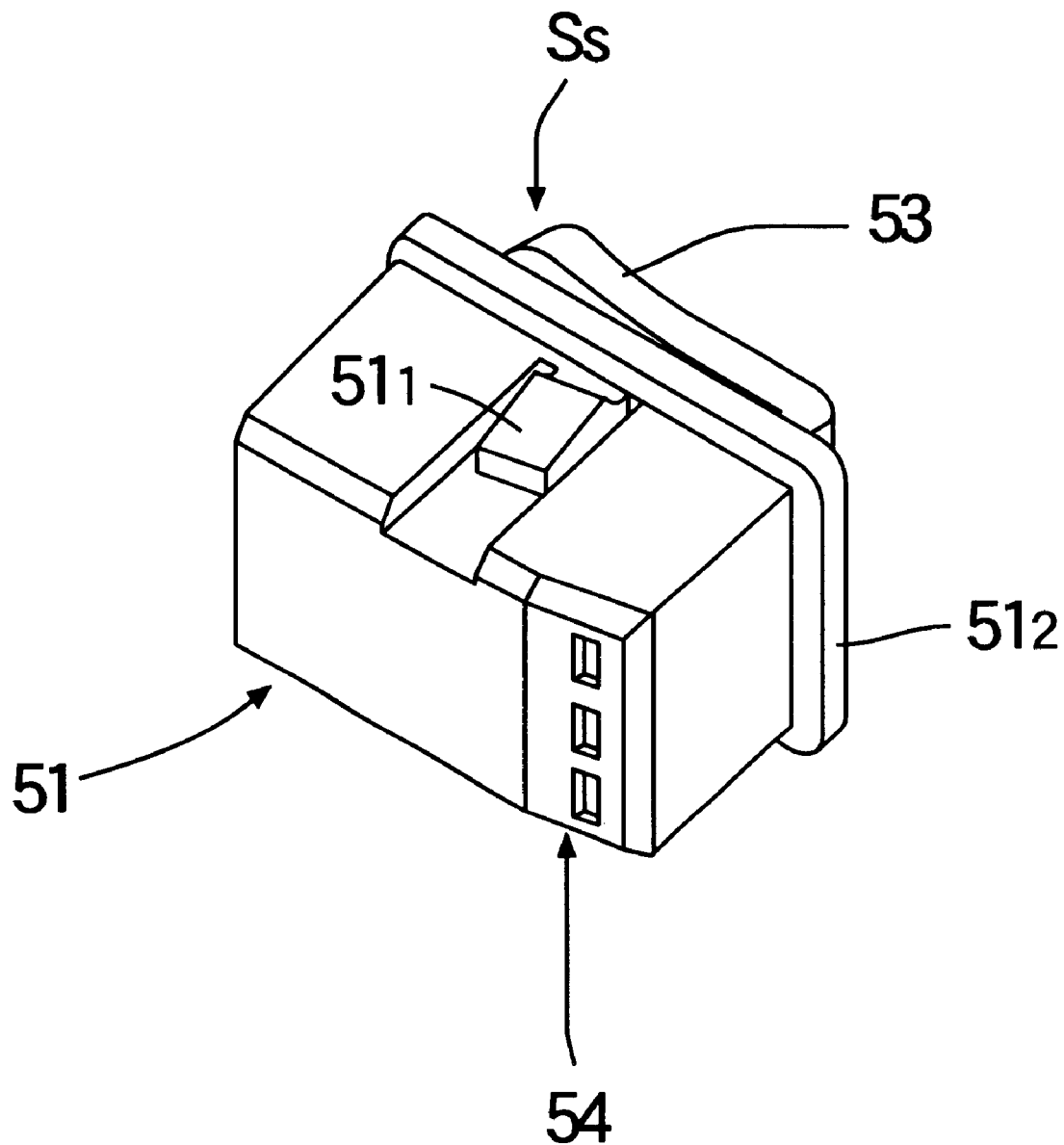

Next, the mounting structure of the starter switch Ss is explained with reference to FIGS. 10 to 12. The mounting structures of the dimmer switch Sd, winker switch Sw and horn switch Sh are virtually the same as that of the starter switch Ss.

The starter switch Ss has a housing 51 made of synthetic resin, an operation knob 53 pivotally supported on the front surface of the housing 51 through a fulcrum pin 52, engagement claws $51_1$, $51_1$ formed on the upper and lower surfaces of the housing 51 respectively, and a female connector 54 embedded in the housing 51. The female connector 54 is integrally embedded in the housing 51 when the housing 51 is injection-molded, with its female terminals 55 . . . accommodated in the inner space of the housing 51.

The busbar embedding substrate 21 integrally embedded in the rear handle cover 1 is formed with an opening 26 in which the starter switch Ss is fitted. An opening 34 of the rear handle cover 1 surrounds the opening 26 on the outer side thereof. In the opening 26 of the busbar embedding substrate 21 is provided with a male connector 30 which comprises a plurality of male terminals 56 . . . integrally formed with the busbars 22 . . . and projecting out of the busbar embedding substrate 21. Using a part of the busbars 22 . . . as the male terminals 56 . . . of the male connector 30 as described above, the number of parts of the male connector 30 can be reduced to simplify the structure and minimize the possibility of wire break and poor contact.

Then, when the starter switch Ss is inserted into the opening 26 of the busbar embedding substrate 21 through the opening 34 of the rear handle cover 1, the male terminals 56 . . . of the male connector 30 installed in the opening 26 of the busbar embedding substrate 21 automatically fit into the female terminals 55 . . . of the female connector 54 embedded in the housing 51 of the starter switch Ss, readily completing the electric connection between the starter switch Ss and the busbars 22 . . . in the busbar embedding substrate 21. When the starter switch Ss is fully inserted into the opening 26 of the busbar embedding substrate 21, the engagement claws $51_1$, $51_1$ provided to the housing 51 engage claw receiving portions $26_1$, $26_1$, provided in the opening 26 of the busbar embedding substrate 21 to prevent the starter switch Ss from coming out. Then, a flange $51_2$ of the housing 51 of the starter switch Ss fits the opening 34 of the rear handle cover 1 to conceal the opening 26 of the busbar embedding substrate 21.

Because the wiring for the meter unit 5, starter switch Ss, dimmer switch Sd, winker switch Sw and horn switch Sh, all of which are mounted to the rear handle cover 1 of the motorcycle V, is carried out by the busbars 22 . . . embedded in the busbar embedding substrate 21 provided to the rear handle cover 1 as described above, not only can the number of parts and manhours required for wiring be reduced substantially but the possibility of short-circuit, wire break and erroneous assembly can also be reduced, compared with a case where the conventional wiring harness is used. Durability is also improved over what is obtained by the wiring harness. Further, because simply inserting the meter unit 5 into the meter unit support hole 43 of the rear handle cover 1 completes an electric connection between the meter unit 5 and the busbars 22 . . . and because simply inserting the starter switch Ss, dimmer switch Sd, winker switch Sw and horn switch Sh into the openings 26–29 of the busbar embedding substrate 21 completes the electric connection between the switches Ss, Sd, Sw, Sh and the busbars 22 . . . , manhours required for assembly can be reduced significantly. Because the meter unit 5 is inserted from outside the rear handle cover 1, the handle cover can be assembled beforehand, which improves work efficiency. Furthermore, because the female terminals 55 . . . of the female connector 54 are installed inside the switches Ss, Sd, Sw, Sh, the female terminals 55 . . . can be protected against deformation and damage thereof, enhancing the electric contact reliability.

Figure 14:
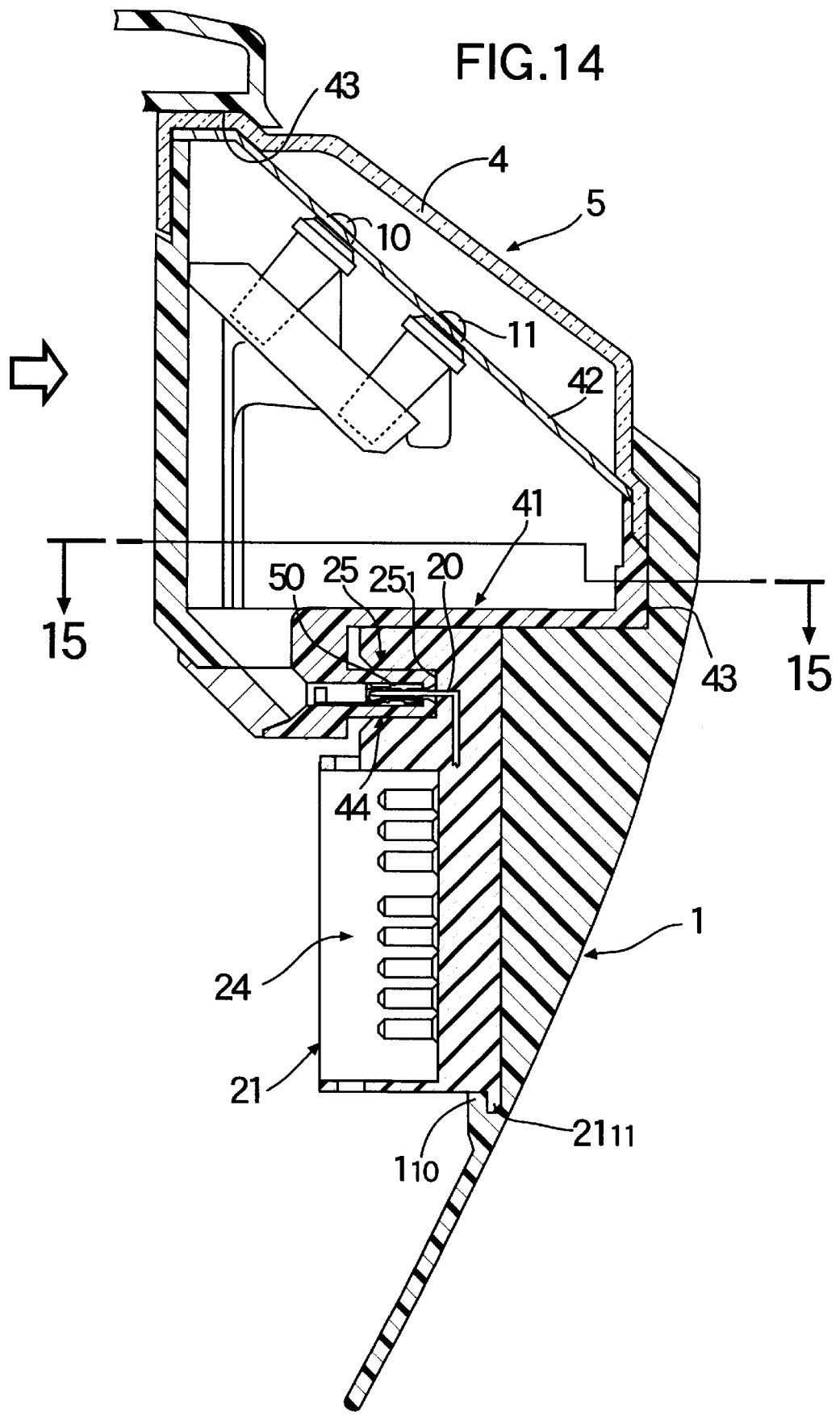
FIGS. 14 and 15 show a second embodiment of this invention.
Figure 15:
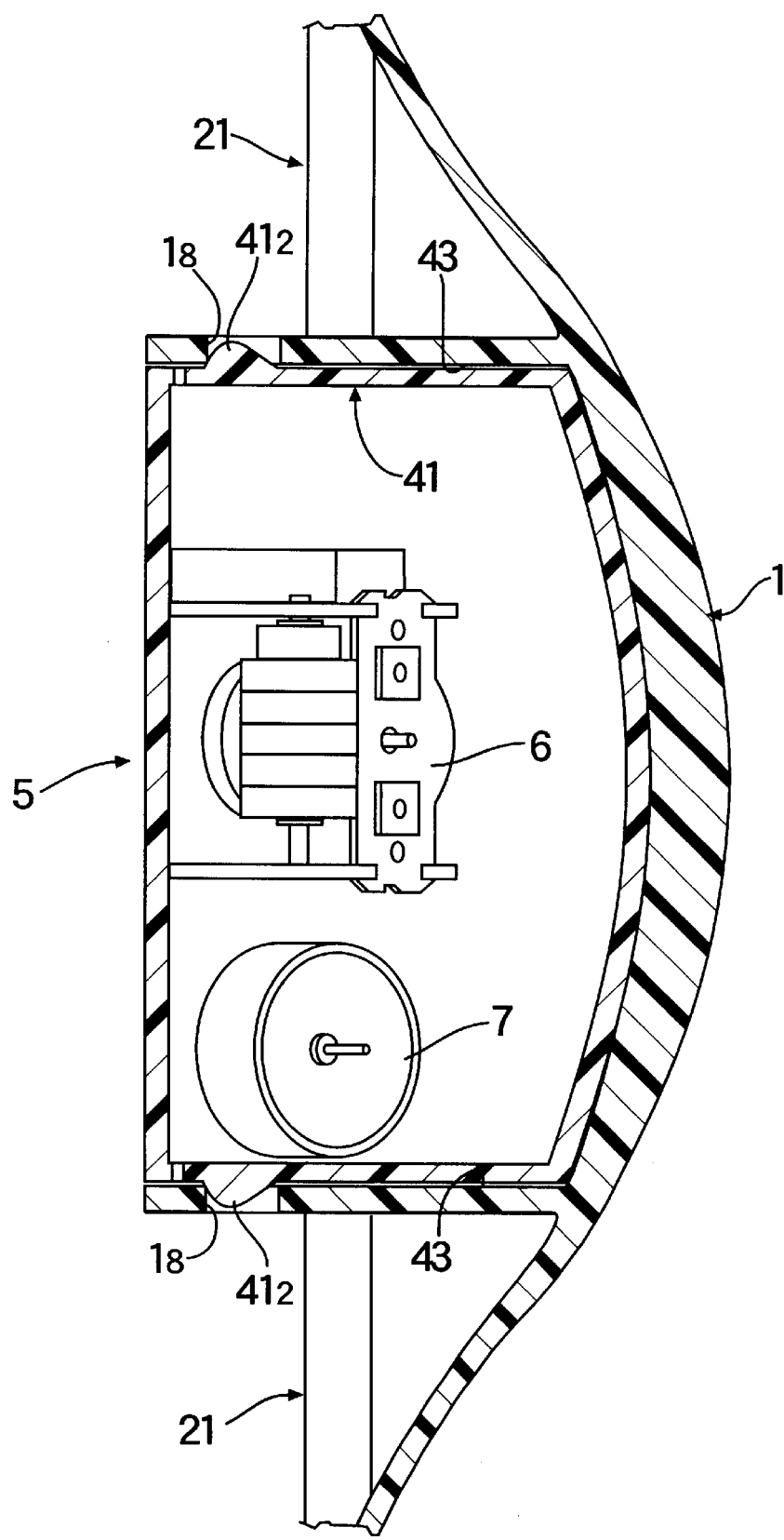

Next, by referring to FIGS. 14 and 15 a second embodiment of this invention will be explained. In the second embodiment, constitutional elements alike to those of the first embodiment carry like reference numerals.

While in the first embodiment the meter unit 5 is inserted downwardly from outside of the rear handle cover 1 for assembly, in the second embodiment the meter unit 5 is assembled by inserting it rearward from inside the rear handle cover 1.

That is, at the central part of the rear handle cover 1 the meter unit support hole 43 is formed in the longitudinal direction and the meter unit 5 is inserted from the inside toward the outside of the rear handle cover 1, i.e., from the front side of the vehicle body toward the rear side thereof. At this time, engagement claws $41_2$, $41_2$ formed on the lateral sides of the housing 41 engage claw receiving portions $1_8$, $1_8$ formed to face the meter unit support hole 43, thereby the meter unit 5 is secured. Because the meter unit 5 is inserted in the longitudinal direction of the vehicle body, the male terminals 20 . . . of the male connector 25 provided on the busbar embedding substrate 21 side and the female terminals 50 . . . of the female connector 44 provided on the meter unit 5 side are arranged in the longitudinal direction of the vehicle body.

Insertion of the meter unit 5 from the inside toward the outside of the rear handle cover 1 increases the degree of freedom of design for the meter unit 5. For example, even when the meter unit 5 increases in size due to an addition of constitutional parts, it is only enough to form a window which allows a display portion of the meter unit 5 to be seen from outside of the rear handle cover 1 (the rider side), thereby an appearance of the meter unit 5 improves.

Figure 16:
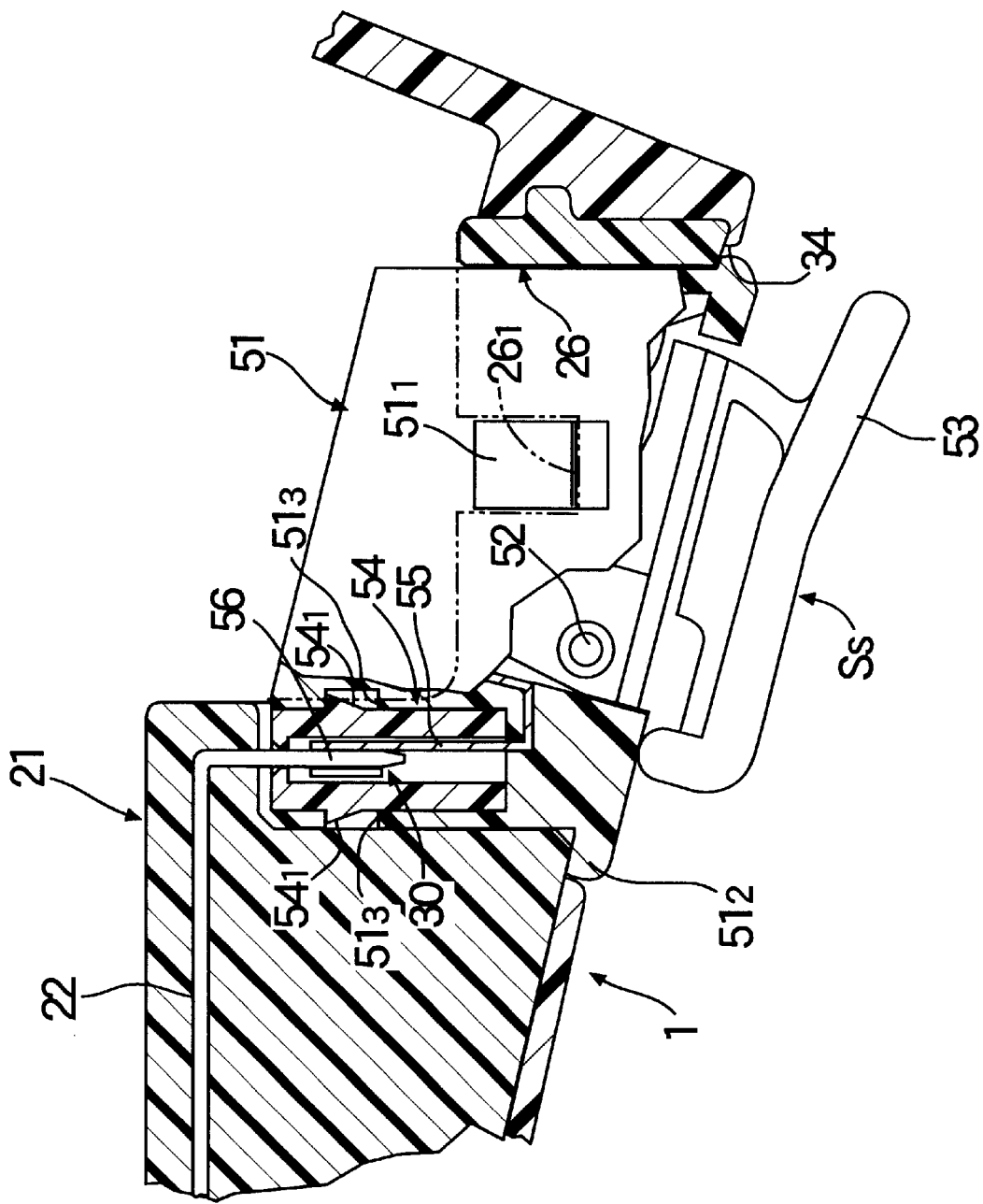
FIG. 16 shows a third embodiment of the present invention and is similar to FIG. 10, but according to the third embodiment of the present invention.

Next, a third embodiment of this invention will be described by referring to FIG. 16.

While the starter switch Ss of the first embodiment has its female connector 54 embedded in the housing 51 when the housing 51 is injection-molded, the starter switch Ss of the third embodiment has its female connector 54 mounted in the housing 51 after the housing 51 is injection-molded. That is, the female connector 54 has a pair of engagement claws $54_1$, $54_1$, and inserting the female connector 54 into the housing 51 causes the engagement claws $54_1$, $54_1$ to engage claw receiving portions $51_3$, $51_3$ of the housing 51, thereby the female connector 54 is fixed to the housing 51. The female terminals 55 . . . are embedded in the housing 51 beforehand and, when the female connector 54 is inserted into the housing 51 the female terminals are fitted into the female connector 54.

Figure 17:
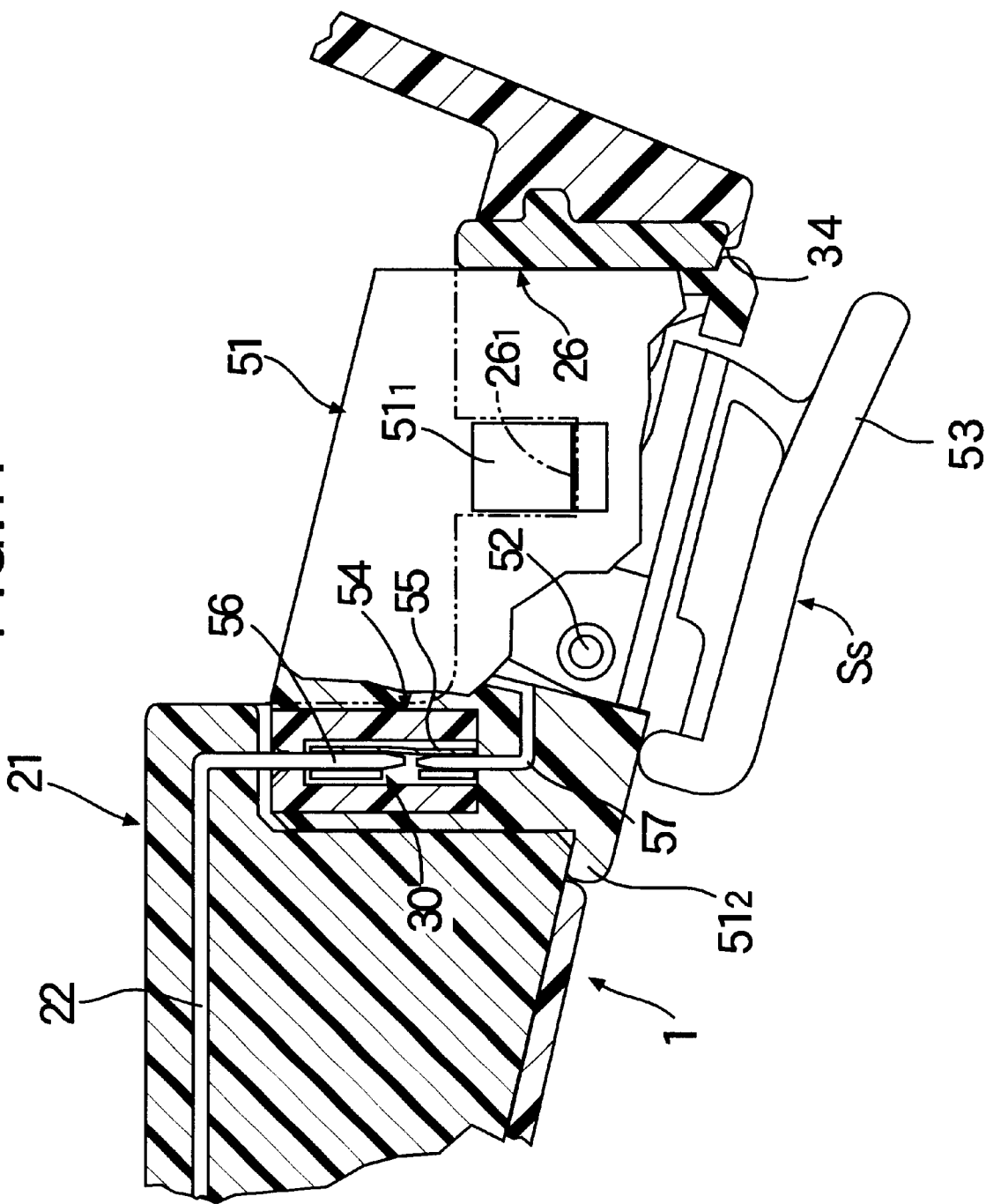
FIGS. 17 and 18 show a fourth embodiment of the present invention.
Figure 18:
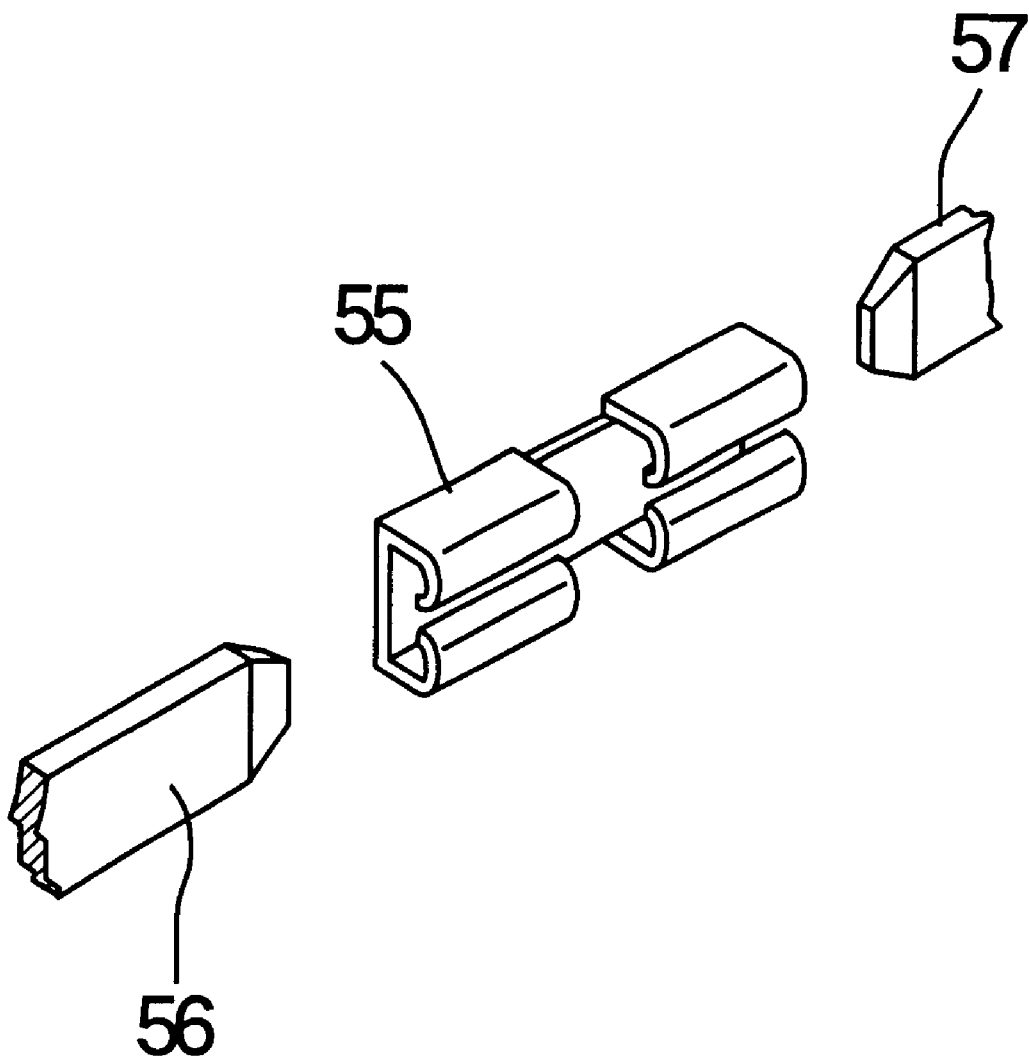

Next, by referring to FIGS. 17 and 18 a fourth embodiment of this invention will be described.

The starter switch Ss of the fourth embodiment has its female terminals 55 . . . loosely fitted in the female connector 54 embedded in the housing 51, and a switch terminals 57 . . . embedded beforehand in the housing 51 are fitted in one end of the female terminals 55 . . . When the male connector 30 is connected to the female connector 54, the male terminals 56 . . . integrally extending from the busbars 22 . . . fit the other end of the female terminals 55 . . . , thus electrically connecting the starter switch Ss to the busbars 22 . . . Since the female terminals 55 . . . are restricted inside the female connector 54, the female terminals 55 . . . are not pulled out of the female connector 54 together with the male terminals 56 . . . when pulling out the male terminals 56 . . .

Embodiments of this invention have been described in detail. It should be noted that various design modifications may be made without departing from the spirit and scope of this invention.

For example, as to the invention described in claims 1, 2 and 4, the conductors are not limited to the busbars 22 . . . but may use a wiring harness. The centering means of claim 4 may be formed in an arbitrary structure. For example, the positional relation between the guide projections 47 and the guide surface $25_2$ can be reversed. The switches of the invention described in claim 5 are not limited to the starter switch Ss, dimmer switch Sd, winker switch Sw and horn switch Sh and may be any other type of switches. Further, the electric parts of this invention described in claims 6 to 9 are not limited to the meter unit 5, starter switch Ss, dimmer switch Sd, winker switch Sw and horn switch Sh and may be any other type of switches. While in the above embodiments the busbars 22 . . . are formed of metal plate strips, they may have an arbitrary cross section and be formed of a metal bar of circular or rectangular cross section. Although the above embodiments have the busbar embedding substrate 21 supported on the rear handle cover 1, it is possible to support the busbar embedding substrate 21 at any part of the handle cover. Further, it is also possible to reverse the positional relation between the female connector 44 and the male connector 25.

What is claimed is:

1. A wiring structure for a motorcycle to electrically connect a meter supported on a handle cover of the motorcycle to conductors arranged inside the handle cover, wherein the conductors are comprised of busbars made of a metal plate or a metal bar embedded in a busbar embedding substrate of a synthetic resin and wherein a handle cover side connector connected to the conductors is provided inside a metal support hole formed in the handle cover and the meter is inserted into the meter support hole thereby to connect a meter side connector provided in the meter to the handle cover side connector simultaneously as the meter is inserted into the meter support hole.

2. A wiring structure for a motorcycle according to claim 1, wherein engagement claws are provided on one of the meter and the handle cover and claw receiving portions are provided on the other of the handle cover and the meter, and said engagement claws and said claw receiving portions are engaged together to prevent the meter from coming out the meter support hole of the handle cover.

3. A wiring structure for a motorcycle according to claim 1, wherein the conductors are constructed of busbars made of a metal plate or a metal bar embedded in a synthetic resin.

4. A wiring structure for a motorcycle according to claim 1, further comprising a centering means to floatingly support the meter side connector with respect to the meter and to center the meter side connector and the handle cover side connector with respect to each other by said centering means being provided between both the connectors.

5. A wiring structure for a motorcycle to electrically connect a switch supported on a handle cover of the motorcycle to conductors arranged inside the handle cover, wherein the conductors are comprised of busbars made of a metal plate or a metal bar embedded in a busbar embedding substrate of a synthetic resin, tip ends of the busbars are projected from the busbar embedding substrate toward an opening formed in the handle cover to form busbar side connector terminals, and switch side connector terminals provided inside the switch are inserted into the opening to connect the busbar side connector terminals and the switch side connector terminals simultaneously as the switch is inserted into the opening.

6. A wiring method for a motorcycle, comprising:
a handle cover connected to the motorcycle and having a meter support hole;
a plurality of conductors arranged inside and connected to the handle cover;
a handle cover side connector connected to the plurality of conductors and disposed inside the meter support hole, the plurality of conductors including busbars made of a metal plate or a metal bar embedded in a busbar embedding substrate of a synthetic resin;
a meter sized and adapted for insertion into the meter support hole formed in the handle cover and having a meter side connector such that, when the meter is inserted into the meter support hole, the meter side connector and the handle cover side connector are simultaneously connected together thereby electrically connecting the meter and the plurality of conductors together with the meter being supported on the handle cover.

7. A wiring structure for a motorcycle, comprising:
a handle cover connected to the motorcycle and having an opening formed into the handle cover;
a busbar embedding substrate fabricated from a synthetic resin and arranged inside the handle cover;
a plurality of conductors in a form of a plurality of busbars fabricated from metal plate or metal bar embedded in the busbar embedding structure, each one of the plurality of busbars having a tip end projecting from the busbar embedding substrate toward the opening to form a busbar side connector terminal; and
a switch sized and adapted for insertion into the opening, formed into the handle cover and having a switch side connector terminal disposed inside the switch such that, when the switch is inserted into the opening, the busbar side connector terminal and switch side connector terminal are simultaneously connected together thereby electrically connecting the switch and the plurality of conductors together.

* * * * *